Sept. 19, 1933.  M. J. GOLDBERG  1,927,311
VALVE ARRANGEMENT FOR OIL ENGINES
Filed April 28, 1930  2 Sheets-Sheet 1
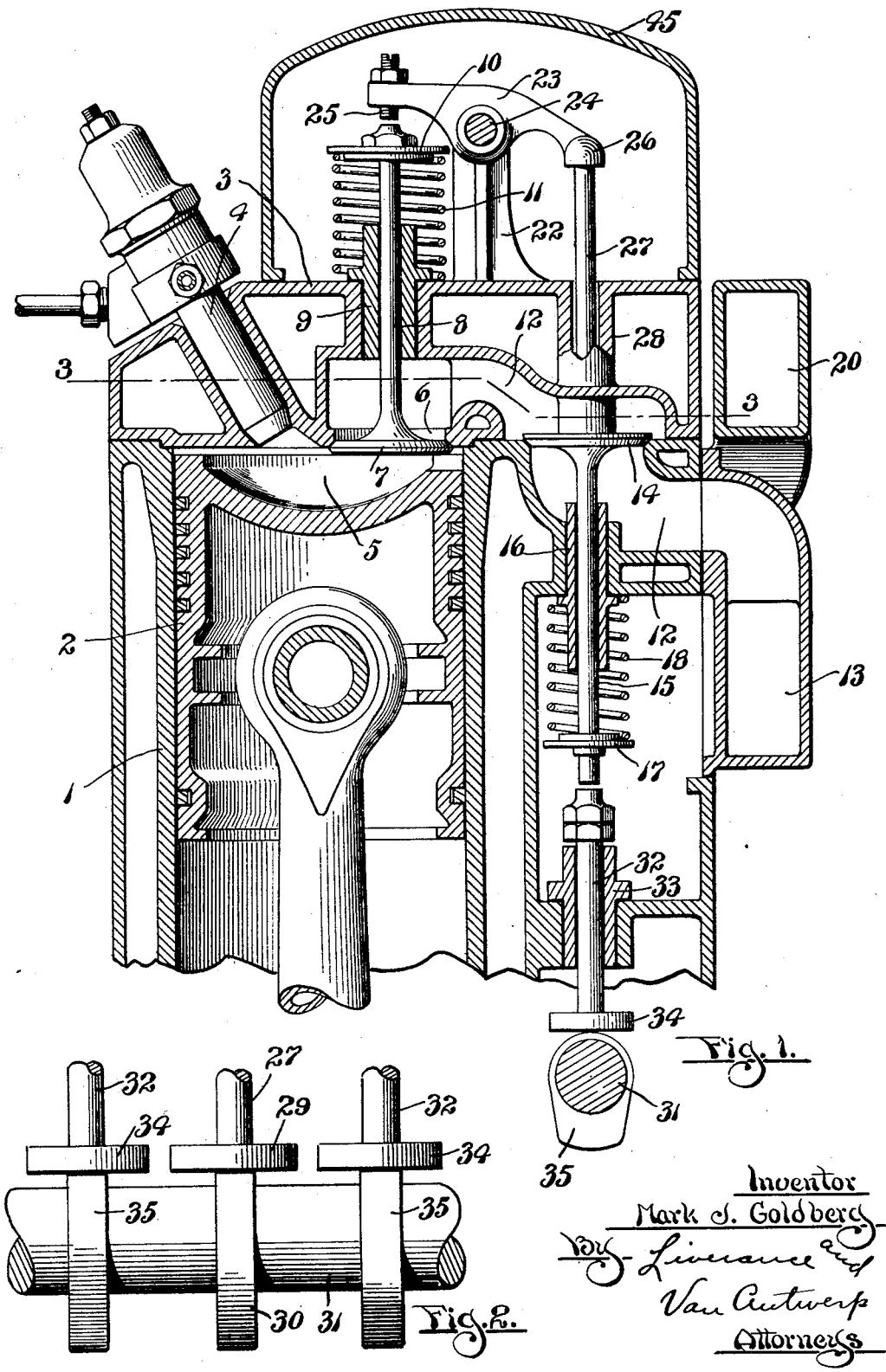

Sept. 19, 1933.   M. J. GOLDBERG   1,927,311
VALVE ARRANGEMENT FOR OIL ENGINES
Filed April 28, 1930   2 Sheets-Sheet 2
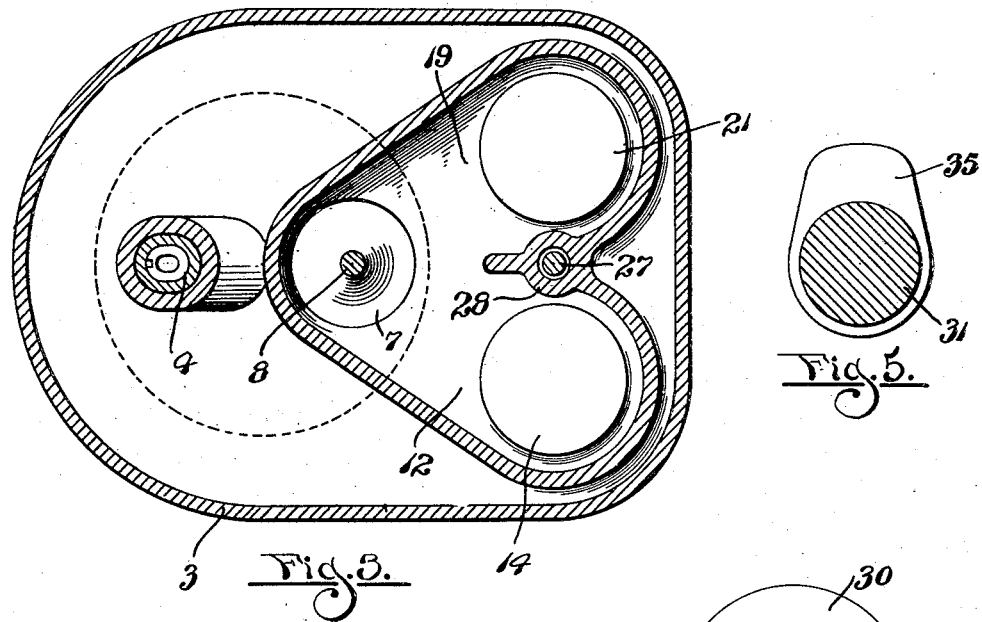
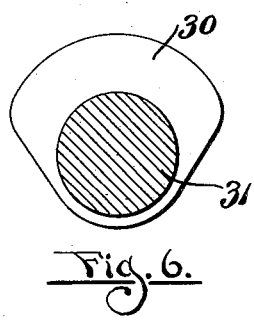
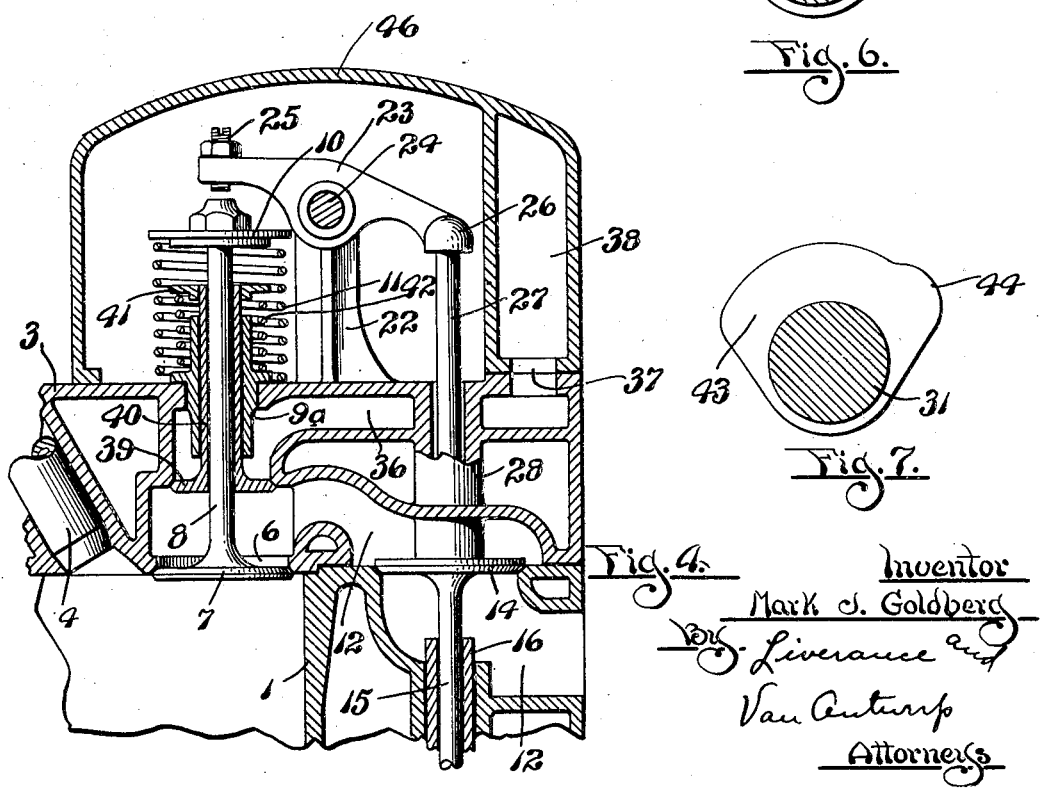

Patented Sept. 19, 1933

1,927,311

UNITED STATES PATENT OFFICE 1,927,311

VALVE ARRANGEMENT FOR OIL ENGINES

Mark J. Goldberg, Beloit, Wis., assignor to Campbell, Wyant & Cannon Foundry Company, Muskegon, Mich., a corporation of Michigan Application April 28, 1930. Serial No. 447,918

3 Claims. (Cl. 123—79)

This invention relates to a valve arrangement for oil engines, preferably of the Diesel type, wherein liquid fuel is injected into compressed air above a piston in an internal combustion engine slightly prior to or substantially at the time that the compression raises the temperature of the air to a point such that it automatically ignites the fuel.

By reason of the high temperatures to which exhaust valves in all types of internal combustion engines are subjected, there is a great danger of rapid deterioration and destruction of the exhaust valves and their seats necessitating regrindings and replacements at times, and there is a further need that the cylinder head be designed, if possible, to provide proper water circulation to cool the valve seats.

In an oil engine of the Diesel or self-ignition high compression type, the exhaust valve is subjected to even greater heat than in the ordinary internal combustion engine. The pressures on compression of the charge in engines of the self-ignition type are also heavier so that if there is any defect in the exhaust valve or its seating the losses are much greater and more detrimental to the effective and proper operation of the engine, with a resultant heavier loss in power and with a greater increase in the difficulty of cold engine starting.

Engines of the self-ignition high compression type require a fuel valve in the head which takes up part of the room normally left for intake and exhaust valves in the ordinary internal combustion engine, thereby precluding the use of large enough valves for self-ignition engines of the high speed type if separate intake and exhaust valves are used. One valve controlling both the intake and exhaust in the head permits a large size of valve and a compact compression chamber which is essential for good construction and which it is one object of my invention to secure.

It is a primary object and purpose of the present invention to overcome and obviate the defects and difficulties present with respect to the exhaust valves of self-ignition high compression internal combustion engines through a novel and comparatively simple, yet effective valve arrangement. It is a further object and purpose of the present invention to provide a practical and efficient valve arrangement wherein the valves are quick acting and are available for utilization in relatively small engines, capable of operating at very high speeds, thereby rendering such engines adaptable for automotive use. Many other objects and purposes, together with novel construction for attaining the same, will be apparent upon understanding of the invention had from the following description, taken in connection with the accompanying drawings, in which, Fig. 1 is a fragmentary vertical section through the upper end of an internal combustion engine cylinder equipped with the valve arrangement of my invention.

Fig. 2 is a fragmentary elevation illustrating the series of cams for controlling the valves for each cylinder.

Fig. 3 is a horizontal section substantially on the plane of line 3—3 of Fig. 1.

Fig. 4 is a vertical section, similar to that shown in Fig. 1, showing the valve arrangement equipped so that supercharging of the air charges to the cylinders may be effectively attained in a simple manner without mechanical complications.

Figs. 5 and 6 are transverse sections through the cam shaft showing in side view the two types of cams used with the engine construction shown in Fig. 1, and Fig. 7 is a similar view illustrative of the type of cam used in place of that shown in Fig. 6 when supercharging is to take place.

Like reference characters refer to like parts in the different figures of the drawings.

The invention is shown applied to a single cylinder 1 though it may be duplicated for each cylinder of any number of cylinders. A piston 2 is mounted for reciprocation in the cylinder, and the cylinder block is closed over the piston by a head 3 which is of suitable design, the same as the cylinder block, for water circulation therethrough for cooling purposes. An injection valve 4 for fuel into the cylinder above the piston is indicated, but the details of said valve form no part of the present invention, being fully described in a co-pending application filed by me. The fuel from the injection valve is to be injected into compressed air above the piston, the piston, preferably, at its upper side, having a concaved recess substantially of the form shown at 5 for compactness of design which is important in Diesel engine design.

A port at 6, above the combustion chamber of the cylinder, is normally closed by a valve 7, termed herein the master valve, and which has a valve stem 8 extending upwardly through a guide sleeve 9 in the head 3. A plate or disc 10 is secured adjacent the upper end of the stem 8 and between it and the upper side of the head 3 a coiled compression spring 11 is located, the normal tendency of which is to lift the stem and valve 7 to port closing position as shown in Fig. 1.

An exhaust outlet passage 12 leads from the master port 6 outwardly to an exhaust pipe or outlet 13. A poppet valve 14 is interposed in the exhaust passage 12 and has a downwardly extending stem 15 guided through a vertical sleeve 16. A plate or disc 17 is secured near the lower end of the stem 15. Between it and the overhead portion of the engine block a coiled spring 18 is disposed which, under compression, has a normal tendency to move the valve stem 15 downward and hold the valve 14 closed as shown in Fig. 1.

There is also an air intake passage 19 (see Fig. 3) alongside and in communication with the exhaust passage 12, air being carried inwardly through this air intake passage from an outside inlet such as indicated at 20 in Fig. 1. A second poppet valve 21 is interposed across the air inlet passage, the same as the exhaust valve 14 is across the exhaust passage 12, and such poppet valve 21 has a like depending stem and a spring to act thereon to normally hold the valve closed in a manner identical with that described with reference to the exhaust valve 14.

A vertical post 22 is connected integrally or otherwise with the head 3 and extends upwardly therefrom, to the upper end of which a lever 23 is pivotally mounted at 24 between the ends of the lever. One end of the lever extends over the upper end of the master valve stem 8 and carries an adjusting screw 25 threaded therethrough which may be adjusted to and located in proper position, the lower end of which is directly over the upper end of the stem 8. The opposite end of the lever 23 is formed into a small inverted cup 26 into which the upper end of a vertical rod 27 extends. Rod 27 passes downwardly through a part 28 cast integral with the head 3 and located substantially midway between the valve stems of valves 14 and 21. The rod 27 at its lower end carries a circular disc like head 29 which bears upon a cam 30 on a cam shaft 31 which is driven in the usual manner by timing gears from the main crankshaft of the engine. Each of the valve stems 15 of the two poppet valves 14 and 21 is actuated by tappets 32 slidably mounted through vertical sleeves 33 and equipped at their lower ends with disc heads 34 which bear against cams 35 on the cam shaft 31. It is, of course, to be understood that the rod 27 may likewise be equipped with a suitable tappet operating means, all of which is well known in the art of internal combustion engines and specifically do not comprise any essential novelty in the present invention.

It will be noted that the cam 30 (see Fig. 6) is of considerably greater face than the cams 35, in fact it is fully equal to or more than twice the face of either cam 35 so that the master valve 7 may be moved to open position and held in such position during the entire time that the exhaust valve 14 is in open position followed by the time that the air inlet valve 21 is held open after the exhaust valve has closed.

Beginning with the parts in the position shown in Fig. 1 and with the piston at the end of its compression stroke, the valves 7, 14 and 21 are closed. A charge of mixed air and fuel in the combustion chamber spontaneously ignited due to high pressure and the high temperature induced thereby drives the piston downwardly in its working stroke. On the return up-stroke or exhaust stroke of the piston, the cam 35, which acts to operate and lift the exhaust valve 14, reaches the head 34 prior to the beginning of the exhaust stroke of the piston to fully lift the valve 14 and afterward the cam 30 reaches a position such that it operates to lift the rod 27 thereby turning the lever 23 and moving the master valve 7 downwardly, thus opening a clear passage for the exhaust gases from the cylinder to pass outwardly through the exhaust outlet passage 12. At or about the time the piston reaches the upper limit of its exhaust stroke the cam 35, which has held the valve 14 open, moves so as to release and permit the closure of the valve by the spring 18; but the cam 30, having its wider face, still holds the master valve 7 open; while substantially at the beginning of the succeeding downward stroke of the piston, that is, its intake stroke, the other cam 35 reaches a position so as to lift the air valve 21 permitting a suction of air into the cylinder past the air valve 21, through the air passage 19, and through the port 6 into the cylinder.

The master valve 7 and the air valve 21 are kept open until the requisite amount of air is taken into the cylinder or until the piston reaches its lowermost position, whereupon the cam 30, controlling the master valve 7, moves to release it and the port 6 is closed and following this the air valve 21 may be closed at leisure. Thereupon on the next up stroke of the piston, or the compression stroke, the air is compressed and at or about the time it reaches a predetermined degree of pressure, usually in the neighborhood of 500 pounds per square inch, the liquid fuel or oil is injected forcibly in the compressed air, disseminating throughout the same, so that a suitable explosive mixture is made which, on ignition and expansion, drives the piston downward on its next downward or working stroke.

It will be evident from the foregoing that the matter of cooling the master valve 7 and the seat against which it bears is very efficiently taken care of. For after each scavenging of the cylinder of the high temperature exhaust gases which pass by and heat the master valve 7 and its seat, there is an inrushing of air at substantially atmospheric temperature passing directly over and by and in intimate engagement with such master valve 7 and its seat. This insures against destructive effects of the high temperatures upon the valve and its seat much more effectively than the ordinary water cooling of valve seats alone can do.

It is also apparent that the movement of the exhaust valve 14 and the air inlet valve 21 are separate and distinct from each other, so that each may be individually controlled and operated by a separate properly designed cam, and the quick closing of one is in no way dependent upon that of the other. This permits high speed operation of the engine and because of the light weight of the valves there is no appreciable inertia to be overcome either in the lifting or the downward movement of the valves. Furthermore, so far as the compression of the charge is concerned, there is a double insurance against leakage of the fuel charges from the engine as in order to escape, it must pass by both the master valve 7 and the exhaust valve 14, or the air inlet valve 21.

In Figs. 4 and 7 there is shown the adaptability of this construction for supercharging with very little change in construction and without necessitating any mechanical difficulties of structure, design or assembly. The head 3 of the engine in the construction shown in Fig. 4 is provided with an inlet passage at 36 above the exhaust passage 12 and the normal air inlet passage 19, which is joined through openings at 37 with a suitable reservoir of air under pressure greater than atmospheric pressure, conventionally indicated at 38. A valve 39 located over the master valve 7 normally closes the inner end of the supercharging inlet passage 36. The valve 39 is at the lower end of a sleeve 40 around the valve stem 8 of the master valve 7, said sleeve passing upwardly through the guide sleeve 9a similar to the guide sleeve 9 as shown in Fig. 1.

A disc like head 1 is permanently secured to the upper end of the supercharging valve sleeve 40, and a coiled compression spring 42 is disposed within the spring 11 between the disc 41 and the outwardly extending flange of the guide sleeve 9a. With this construction the cam 43 on the cam shaft replaces the cam 30 which is used to operate the master valve 7 in the construction as shown in Fig. 1. Such cam 43 is like the cam 30 and effects the same movements of the master valve 7, opening it for the escape of exhaust gases and holding it open for the normal inlet of air, but during the latter portion of the downward intake stroke of the piston the projection 44 on the cam 43 operates to turn the lever 23 farther and thus bring the head 10 on the master valve stem 8 into engagement with the head 41 on the sleeve 40 and move the valve 39 downwardly, thus opening passage for air under heavier pressure than normal atmospheric pressure to pass into the cylinder from the passage 36. The air intake valve 21 must be closed before valve 39 is opened, otherwise the supercharge will escape outwardly past valve 21. The supercharging in engines is well known and is used where great specific power is desired in limited spaces and with the use of a limited weight of materials, also in aeroplane engines for high altitude flying and the like; and supercharging the engine with my invention is very readily and easily attained.

With an engine construction as described in addition to the many advantages previously stated, one very marked advantage is the elimination of one set of ports to each cylinder. That is a single master valve and a single port is required only at the upper end of each cylinder, where in normal practice there must be both an exhaust and an intake port. With the omission of the extra port and/or valve in the head it is possible to provide a more effective auxiliary cooling of the valve seat through water cooling in addition to the cooling thereof by the passage of the incoming air. The construction is practical, relatively simple and is very effective for the purposes for which it is designed. The invention is defined in the appended claims and is to be considered comprehensive of all forms of structure coming within their scope.

I claim:

1. An internal combustion engine comprising, a cylinder, a head to cover the combustion end of said cylinder having a single inlet port to the combustion chamber thereof and air inlet, supercharging, and scavenging passages communicating with said port, a valve for closing the port, means yieldingly holding the valve in closing position, a reciprocating piston in the cylinder adapted to reciprocate four strokes in a cycle of the engine, means for opening the port valve during the scavenging and air intake strokes, of the piston whereby the exhaust gases are forced from the piston followed by air being drawn into the cylinder through said port and around the port valve to cool the same, and valve controlled means for supercharging the cylinder during the latter part of the period that the port valve is held open.

2. In a construction of the class described, a cylinder having a single port entrance thereinto with air and scavenging passages communicating with said port, a valve for said port, a stem extending from the valve, a head for the cylinder in which said port is made, said head having a passage to carry supercharging gases to the cylinder and said passage having an outlet in axial alignment with the port, a second valve to close said outlet, a sleeve extending from the second valve located around said valve stem, spring means acting on each said stem and said sleeve for normally holding the valves in closed position, means for opening the port valve a predetermined distance and thereafter for a greater distance, and means for opening said second valve when the port valve is opened the greater distance thereby opening said supercharging passage to the cylinder.

3. An internal combustion engine comprising, a cylinder, a head therefor, said head having a single port and two passages joining with said port one for exhaust gases and the other for air intake, and also having a third passage for supercharging having an opening located in axial alignment with the port, a spring actuated valve for closing said port, two additional spring actuated valves normally closing said exhaust and air intake passages, a fourth spring actuated valve normally closing the third passage, means for moving the port valve and exhaust passage valves to open position substantially at the same time and holding the same open for predetermined times, the port valve longer than the exhaust valve, means for opening the air intake passage valve while said port valve is open and substantially at the time the exhaust valve is released to close, and means for moving the fourth valve to open position during the time that the port valve and intake passage valves are in open position, said port valve, fourth valve and intake passage valve being released for spring actuated movement to closed position substantially simultaneously.

MARK J. GOLDBERG.